(12) United States Patent
Kelly (10) Patent No.: US 9,961,434 B2
(45) Date of Patent: May 1, 2018

(54) IN-EAR HEADPHONES HAVING A FLEXIBLE NOZZLE AND RELATED METHODS

(71) Applicant: Skullcandy, Inc., Park City, UT (US)

(72) Inventor: Peter M. Kelly, Park City, UT (US)

(73) Assignee: Skullcandy, Inc., Park City, UT (US)

(*) Notice: Subject to any disclaimer, the term of this patent is extended or adjusted under 35 U.S.C. 154(b) by 26 days.

(21) Appl. No.: 14/965,635

(22) Filed: Dec. 10, 2015

(65) Prior Publication Data

US 2016/0192058 A1 Jun. 30, 2016

Related U.S. Application Data

(60) Provisional application No. 62/098,911, filed on Dec. 31, 2014.

(51) Int. Cl.
*H04R 1/10* (2006.01)

(52) U.S. Cl.
CPC ......... *H04R 1/1066* (2013.01); *H04R 1/1016* (2013.01); *B60B 2310/321* (2013.01); *H04R 1/1058* (2013.01); *H04R 2201/025* (2013.01)

(58) Field of Classification Search
CPC .. H04R 1/1066; H04R 1/1016; H04R 1/1058; H04R 2201/025; B60B 2310/321
USPC ........................................................ 381/380
See application file for complete search history.

(56) References Cited

U.S. PATENT DOCUMENTS

| 2,188,591 | A | 1/1940 | Carlson |
| 2,487,038 | A | 3/1944 | Baum |
| 5,825,896 | A | 10/1998 | Leedom |
| 5,979,589 | A | 11/1999 | Aceti |
| 6,129,175 | A | 10/2000 | Tutor et al. |
| 6,411,722 | B1 | 6/2002 | Wolf |
| 6,741,719 | B1 | 5/2004 | Orten |
| 7,349,550 | B2 | 3/2008 | Oliveira et al. |
| 7,548,629 | B1 | 6/2009 | Griffin |

(Continued)

FOREIGN PATENT DOCUMENTS

| EP | 0894604 A1 | 2/1999 |
| EP | 2809081 A1 | 12/2014 |
| WO | 2008118248 A2 | 10/2008 |

OTHER PUBLICATIONS

European Search Report for European Application No. 15201913 dated May 3, 2016, 9 pages.

(Continued)

*Primary Examiner* — Jason R Kurr
(74) *Attorney, Agent, or Firm* — TraskBritt (57) ABSTRACT

In-ear headphone assemblies and related methods are disclosed. An in-ear headphone assembly includes a rigid shell, a rigid nozzle, and a resilient overmold structure permanently molded to the rigid nozzle and the rigid shell. The resilient overmold structure secures a proximal end of the rigid nozzle proximate to a first side of the rigid shell defining a sound aperture. The resilient overmold structure defines a sound passage acoustically coupling a volume defined by the rigid shell to a sound channel of the rigid nozzle through the sound aperture and the proximal end of the rigid nozzle. A method of manufacturing a headphone assembly includes positioning the rigid nozzle and the rigid shell within a cavity of a mold, and injecting a polymer or polymer precursor material into the cavity of the mold.

17 Claims, 8 Drawing Sheets

(56) References Cited

U.S. PATENT DOCUMENTS

| | | | |
|---|---|---|---|
| 7,720,242 B2 * | 5/2010 | Anderson | H04R 25/656 |
| | | | 381/322 |
| 8,103,040 B2 | 1/2012 | Pelland et al. | |
| 8,111,863 B2 | 2/2012 | Oliveira et al. | |
| 8,111,864 B2 | 2/2012 | Oliveira et al. | |
| 8,194,911 B2 | 6/2012 | Dyer et al. | |
| 8,311,259 B2 | 11/2012 | Pinter et al. | |
| 8,503,710 B1 * | 8/2013 | Meyberg | H04R 1/1066 |
| | | | 381/370 |
| 8,550,207 B1 | 10/2013 | Barnes | |
| 8,553,923 B2 | 10/2013 | Tiscareno et al. | |
| 8,571,227 B2 | 10/2013 | Donaldson et al. | |
| 8,582,755 B2 | 11/2013 | Bradford et al. | |
| 8,638,970 B2 | 1/2014 | Burton | |
| 8,755,548 B2 | 6/2014 | Zhao et al. | |
| 9,113,254 B2 * | 8/2015 | Cotha | H04R 1/1058 |
| 9,532,127 B2 * | 12/2016 | Burton | H04R 1/1016 |
| 2005/0147269 A1 * | 7/2005 | Oliveira | H04R 1/10 |
| | | | 381/382 |
| 2006/0279084 A1 | 12/2006 | Collins et al. | |
| 2007/0133836 A1 | 6/2007 | Lee | |
| 2008/0152163 A1 * | 6/2008 | Mulvey | H04R 1/1016 |
| | | | 381/74 |
| 2008/0260196 A1 | 10/2008 | Tsai | |
| 2009/0161885 A1 | 6/2009 | Donaldson et al. | |
| 2010/0246879 A1 | 9/2010 | Siahaan et al. | |
| 2011/0188689 A1 | 8/2011 | Beck et al. | |

OTHER PUBLICATIONS

European Office Action for European Application No. 15201913.9 dated Sep. 5, 2017, 4 pages.

\* cited by examiner

IN-EAR HEADPHONES HAVING A FLEXIBLE NOZZLE AND RELATED METHODS

CROSS-REFERENCE TO RELATED APPLICATION

This application claims the benefit of U.S. Provisional Patent Application Ser. No. 62/098,911, filed Dec. 31, 2014, the disclosure of which is hereby incorporated herein in its entirety by this reference.

TECHNICAL FIELD

The present disclosure relates to in-ear headphone assemblies having a flexible nozzle, and related methods for manufacturing headphone assemblies having a flexible nozzle.

BACKGROUND

In recent years, in-ear headphones have gained popularity. This increase in popularity may be partly due to the generally smaller, lighter, and less obtrusive geometry offered by in-ear headphones compared to on-ear and over-ear headphones. Also, some people may prefer the sound generated by in-ear headphones compared to other types of headphones.

Although in-ear headphones offer advantages over other types of headphones, there are also some disadvantages associated with in-ear headphones. Among these disadvantages is the difficulty of designing in-ear headphones that fit properly in the ears of most or all people. The size and shape of each different person's inner and outer ears is unique. In fact, the size and shape of one of a person's ears may be different from the size and/or shape of that same person's other ear.

Figure 1:
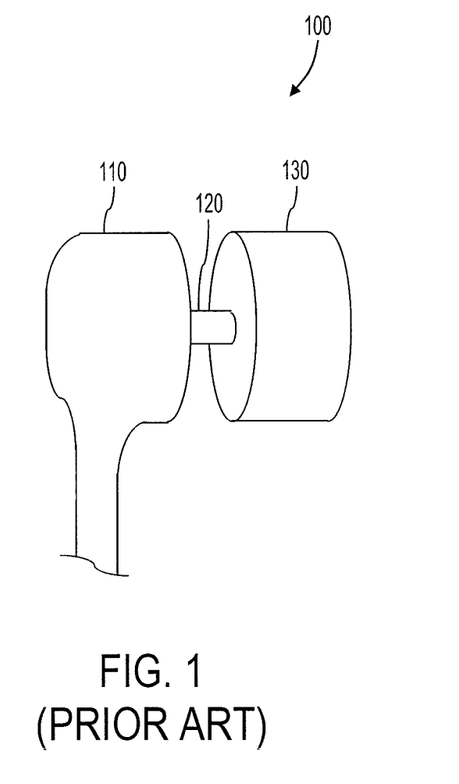
FIG. 1 is a simplified side view of a conventional in-ear headphone.

Some manufacturers of in-ear headphones have addressed the variability in size and shape of different peoples' ears by selling in-ear headphones with multiple interchangeable soft eartips of different sizes. FIG. 1 is a simplified side view of this type of conventional in-ear headphone 100. The in-ear headphone 100 includes a housing 110, a rigid nozzle 120 coupled to the housing, and a soft eartip 130 removably coupled to the rigid nozzle 120.

With the soft eartip 130 coupled to the rigid nozzle 120, the eartip 130 and part of the rigid nozzle 120 may be inserted into the ear canal of the user's ear. The soft eartip 130 may provide some conformity to different shapes of ears. Also, users of this kind of in-ear headphone 100 can try on the headphone 100 with the various different soft eartips 130 until the most comfortable soft eartip 130 is identified.

BRIEF SUMMARY

In some embodiments, the present disclosure comprises an in-ear headphone assembly. The in-ear headphone assembly includes a rigid shell defining a volume and configured for housing an audio driver. A first side of the rigid shell defines a sound aperture. The in-ear headphone assembly also includes a rigid nozzle defining a sound channel extending axially therethrough. The rigid nozzle includes a distal end configured for insertion at least partially into an ear canal of a user. The rigid nozzle also includes a proximal end opposite the distal end. The headphone assembly further includes a resilient overmold structure permanently molded to the rigid nozzle and the rigid shell. The resilient overmold structure secures the proximal end of the rigid nozzle proximate to the first side of the rigid shell. The resilient overmold structure defines a sound passage acoustically coupling the volume to the sound channel through the sound aperture and the proximal end of the rigid nozzle.

In some embodiments, the present disclosure comprises a method of flexibly attaching a rigid nozzle to a rigid shell to form an in-ear headphone assembly. The method includes positioning a rigid nozzle and a rigid shell within a cavity of a mold such that a proximal end of the rigid nozzle is located proximate to a sound aperture in a first side of the rigid shell. The method also includes injecting a polymer or polymer precursor material into the cavity of the mold and forming an overmold structure around the rigid nozzle and the rigid shell, the overmold structure including a sound passage coupling the sound aperture to a sound channel extending axially through the rigid nozzle, the overmold structure providing a permanent, flexible connection between the rigid nozzle and the rigid shell.

BRIEF DESCRIPTION OF THE SEVERAL VIEWS OF THE DRAWINGS

FIGS. 3A through 3D are different simplified views of a portion of the headphone assembly of FIG. 2;

FIG. 3B is a top view of the portion of the headphone assembly;

FIGS. 4A and 4B are simplified side views of an example of a mold assembly that assembly that may be used for manufacturing the headphone assembly of FIGS. 2 through 3D;

DETAILED DESCRIPTION

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.)

or method, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Embodiments of the present disclosure include headphones having a flexible nozzle, and methods for manufacturing such headphones.

As used herein, the term "overmold structure" refers to a structure that is formed by molding the overmold structure to another existing structure, forming a permanent bond between the overmold structure and the existing structure.

Figure 2:
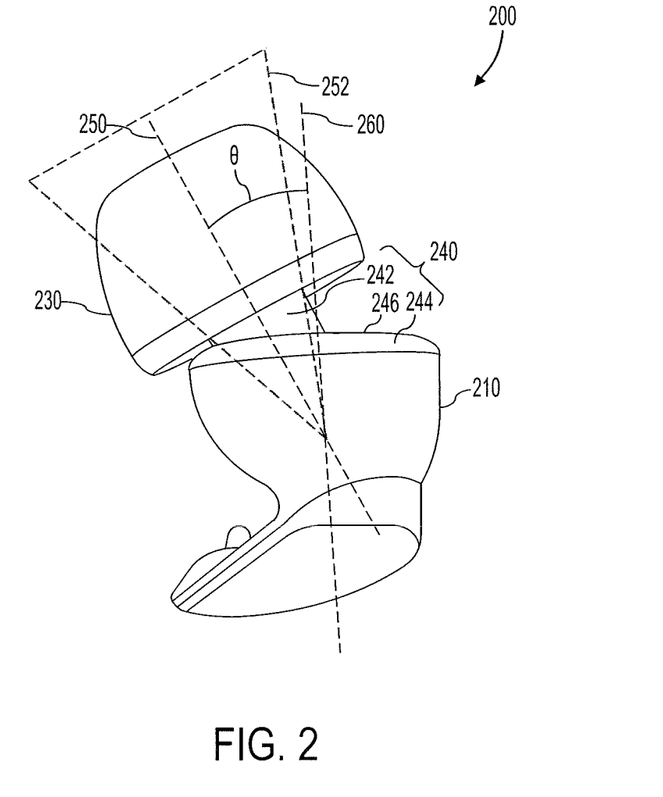
FIG. 2 is a simplified side view of a headphone assembly according to embodiments of the present disclosure.

FIG. 2 is a simplified side view of a headphone assembly 200. The headphone assembly 200 may include a rigid shell 210 defining a volume inside the rigid shell 210, in which an audio driver may be housed. The headphone assembly 200 may also include an overmold structure 240 including a shell portion 244 and a nozzle portion 242. The shell portion 244 may be configured to couple to the rigid shell 210, and the nozzle portion 242 may be configured to couple to a rigid nozzle 320 (FIGS. 3A through 3D). In other words, the rigid nozzle 320 may be permanently coupled to the rigid shell 210 by the overmold structure 240. The nozzle portion 242 of the overmold structure 240 may extend from an outer face 246 of the shell portion 244 of the overmold structure 240.

The headphone assembly 200 may further include a resilient eartip 230, which may be removably or permanently coupled to the rigid nozzle 320. In embodiments in which the resilient eartip 230 is removable, the headphone assembly 200 may benefit from the ability to interchange different resilient eartips 230 of different sizes and/or materials to provide a customizable fit.

The resilient eartip 230, and at least part of the rigid nozzle 320 may be configured for insertion into the ear canal of a user's ear. In some embodiments, to provide a comfortable fit, an undeformed axis 250 of the nozzle portion 242 (and of the rigid nozzle 320) may extend at an angle θ from the central axis 260 of the rigid shell 210. In other words, when no deforming force is applied to the nozzle portion 242, the nozzle portion 242 may form the angle θ with the central axis 260 of the rigid shell 210. The angle θ may be selected such that the headphone assembly 200 fits properly into an average ear. By way of non-limiting example, the angle θ may be between about 18° and about 30° (e.g., about 24°).

Since most people's ears are different from the average ear, the overmold structure 240 may include a resilient material selected to enable the nozzle portion 242 to flex away from the undeformed axis 250.

The overmold structure 240 may be formed from and comprise an elastomeric material. The elastomeric material may comprise a thermoset or a thermoplastic polymer material.

The nozzle portion 242 of the overmold structure 240 may be configured to flex in any direction away from the undeformed axis 250 of the nozzle portion 242 when a deforming force is applied to the nozzle portion 242 (e.g., when the headphone 200 is inserted into a user's ear and the walls of the user's ear canal apply a deforming force to the nozzle portion 242). In other words, the nozzle portion 242 may be configured with a 360° range of motion around the undeformed axis 250 of the nozzle portion 242. In some embodiments, the nozzle portion 242 may be configured to flex to at least about 5°, at least about 10°, or even at least about 20° in any direction away from the undeformed axis 250 of the nozzle portion 242. The range of motion of the nozzle portion 242 may define an imaginary circular cone 252 around the undeformed axis 250 of the nozzle portion 242. This ability of the nozzle portion 242 to flex away from the undeformed axis 250 in any direction may enable the headphone assembly 200 to comfortably conform to the shape of most or all ears. Also, this ability of the nozzle portion 242 to flex, along with the ability to switch the resilient eartip 230 for different sized eartips 230 may enable the headphone assembly 200 to fit both the size and shape of most or all ears.

Figure 3A:
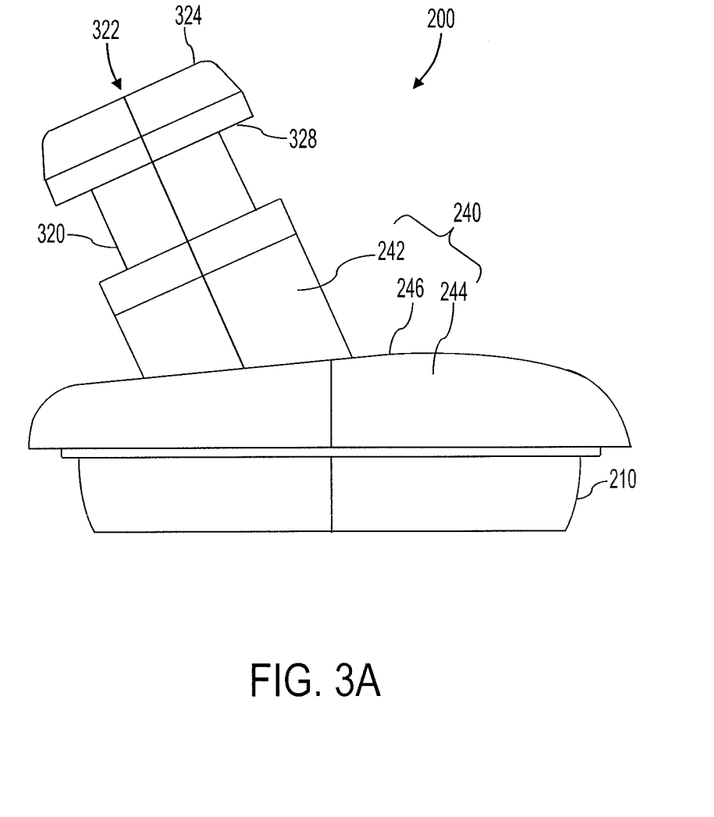
FIG. 3A is a side view of the portion of the headphone assembly.
Figure 3B:
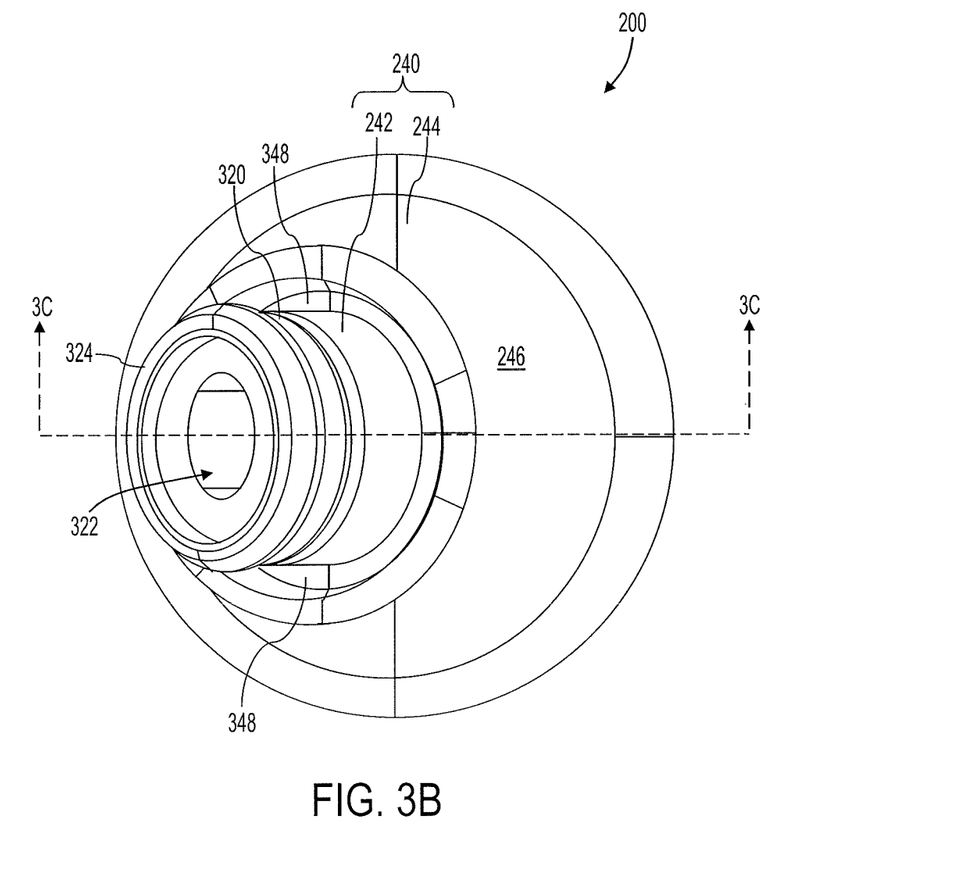
Figure 3C:
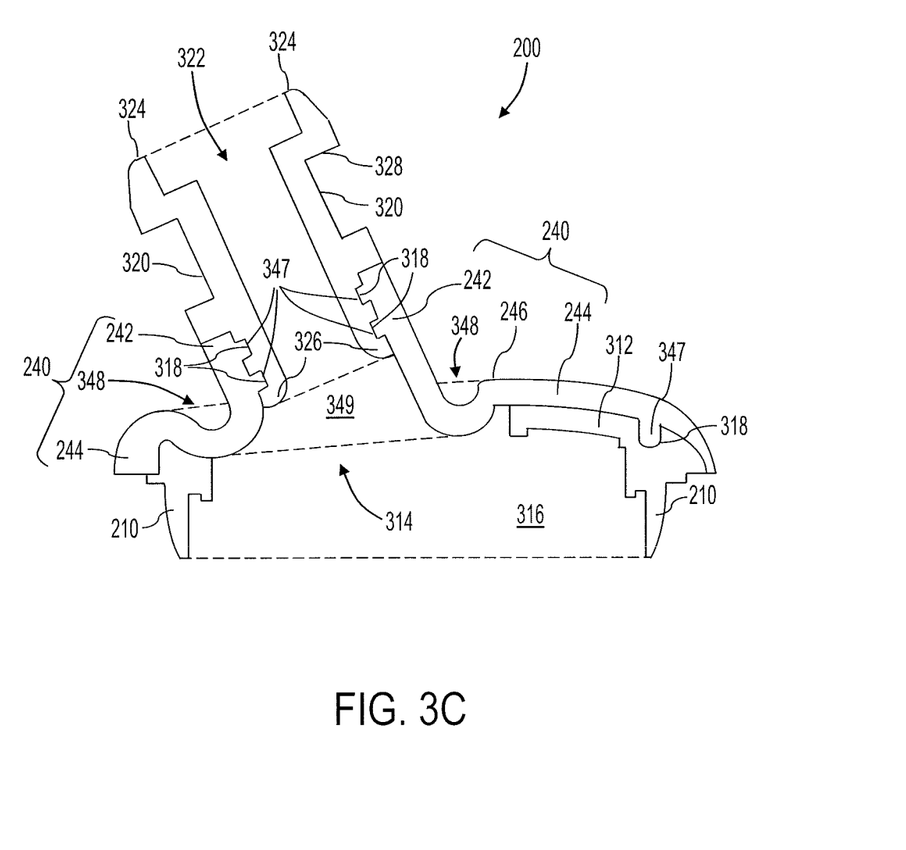
FIG. 3C is a cross-sectional view of the portion of the headphone assembly that is taken along line 3C of FIG. 3B.
Figure 3D:
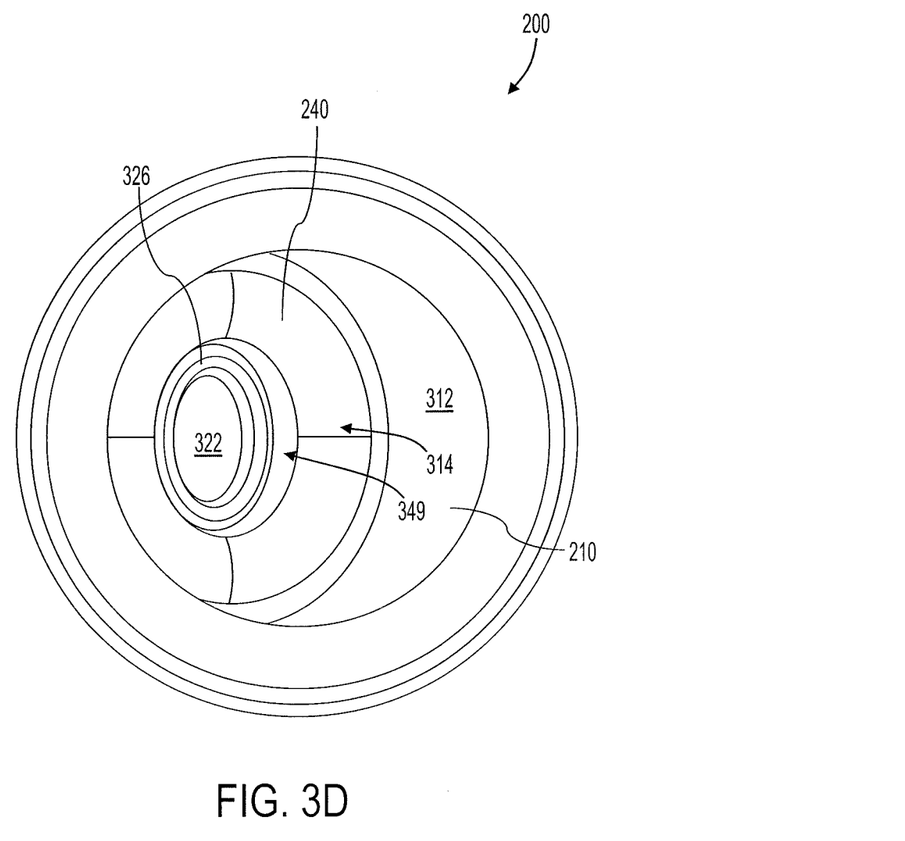
FIG. 3D is a bottom view of the portion of the headphone assembly.

FIGS. 3A through 3D are different views of a portion of the headphone assembly 200 with the eartip 230 removed from the rigid nozzle 320 (to enable the rigid nozzle 320 to be seen). FIG. 3A is a side view of the portion of the headphone assembly 200. FIG. 3B is a top view of the portion of the headphone assembly 200. FIG. 3C is a cross-sectional view of the portion of the headphone assembly 200 that is taken along line 3C of FIG. 3B. FIG. 3D is a bottom view of the portion of the headphone assembly 200. The following discussion refers to FIGS. 3A through 3D together.

As previously discussed, the headphone assembly 200 includes the rigid shell 210, permanently and flexibly coupled to the rigid nozzle 320 by the overmold structure 240. As perhaps best shown in the cross-sectional view of FIG. 3C, the rigid shell 210 defines a volume 316, in which an audio driver may be housed. The rigid shell 210 may also include a first side 312 having a sound aperture 314 therein.

The rigid nozzle 320 may include a proximal end 326 and a distal end 324, the terms "proximal" and "distal" being relative to the rigid shell 210 in the assembled state. The rigid nozzle 320 may define a sound channel 322 extending axially therethrough from the proximal end 326 to the distal end 324. The proximal end 326 may be positioned proximate to the sound aperture 314 of the rigid shell 210. In some embodiments, the distal end 324 may include a lip 328 for removably securing the resilient eartip 230 (FIG. 2) to the distal end 324 of the rigid nozzle 320.

The interior surfaces of the overmold structure 240 may define a sound passage 349 acoustically coupling the volume 316 through the sound aperture 314 in the rigid shell 210 to the sound channel 322 of the rigid nozzle 320. In operation, sound waves from an audio driver housed within the rigid shell 210 may travel from the volume 316 through the sound aperture 314, the sound passage 349, and the sound channel 322 into a user's ear canal.

The overmold structure 240 may permanently secure the rigid nozzle 320 to the rigid shell 210. By way of non-limiting example, a chemical adhesion bond and/or mechanical interference resulting from molding the overmold structure 240 to the rigid nozzle 320 and the rigid shell 210 may secure the overmold structure 240 to the rigid nozzle 320 and the rigid shell 210.

The nozzle portion 242 of the overmold structure 240 may extend over an outside surface of the proximal end 326 of the rigid nozzle 320. The shell portion 244 of the overmold structure 240 may at least substantially cover the first side 312 of the rigid shell 210. The overmold structure 240 may also include irregularities such as protrusions 347 that matingly engage with indentations 318 in the rigid shell 210 and the rigid nozzle 320 to improve mechanical strength. Of course, rather than protrusions 347 of the overmold structure 240 that matingly engage with indentations 318 in the rigid shell 210 and the rigid nozzle 320, indentations in the overmold structure 240 could also matingly engage with protrusions from the rigid shell 210 and the rigid nozzle 320.

For example, these protrusions 347 and mating indentations 318 may increase a bonded surface area between the overmold structure 240 and each of the rigid nozzle 320 and the rigid shell 210. Also, these protrusions 347 and mating indentations 318 may provide mechanical interference to further prevent bonded surfaces from being separated.

To improve flexibility of the rigid nozzle 320 with respect to the rigid shell 210, the overmold structure 240 may include a recess 348 in the outer face 246 of the overmold structure 240 at least partially around an interface between the nozzle portion 242 and the shell portion 244. In some embodiments, the overmold structure 240 may indent into the sound aperture 314 at the recess 348. Accordingly, the sound aperture 314 may be larger than a diameter of the proximal end 326 of the rigid nozzle 320.

In some embodiments, the recess 348 may extend continuously all the way around the interface between the nozzle portion 242 and the shell portion 244. In some embodiments, the recess 348 may extend only partially around the interface between the nozzle portion 242 and the shell portion 244. In some embodiments, the recess 348 may include a plurality of disjointed recesses around the interface between the nozzle portion 242 and the shell portion 244.

Figure 4A:
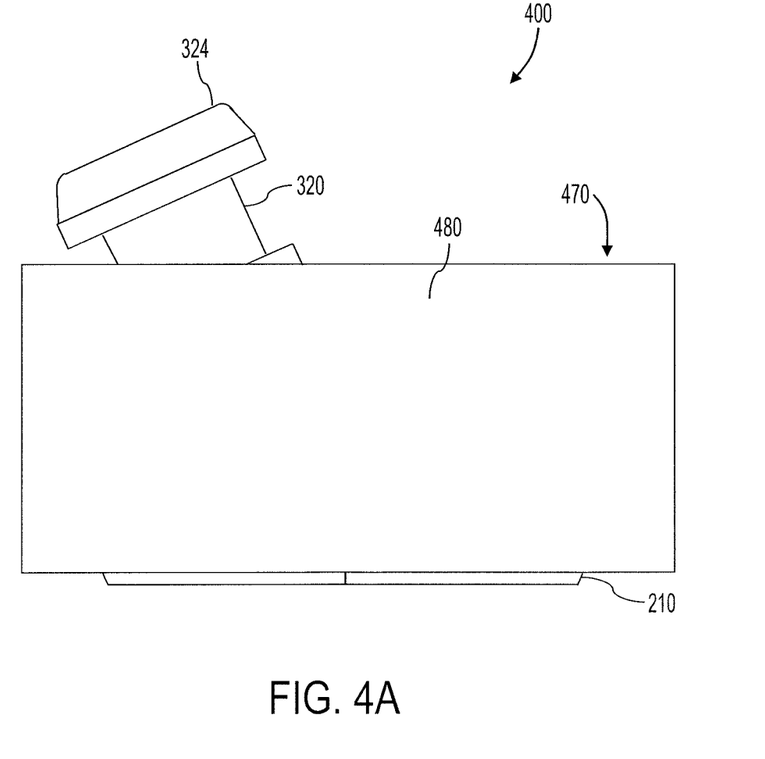
FIG. 4A is a view of the mold assembly with a first mold half and a second mold half enclosing at least a portion of a rigid nozzle and a rigid shell.
Figure 4B:
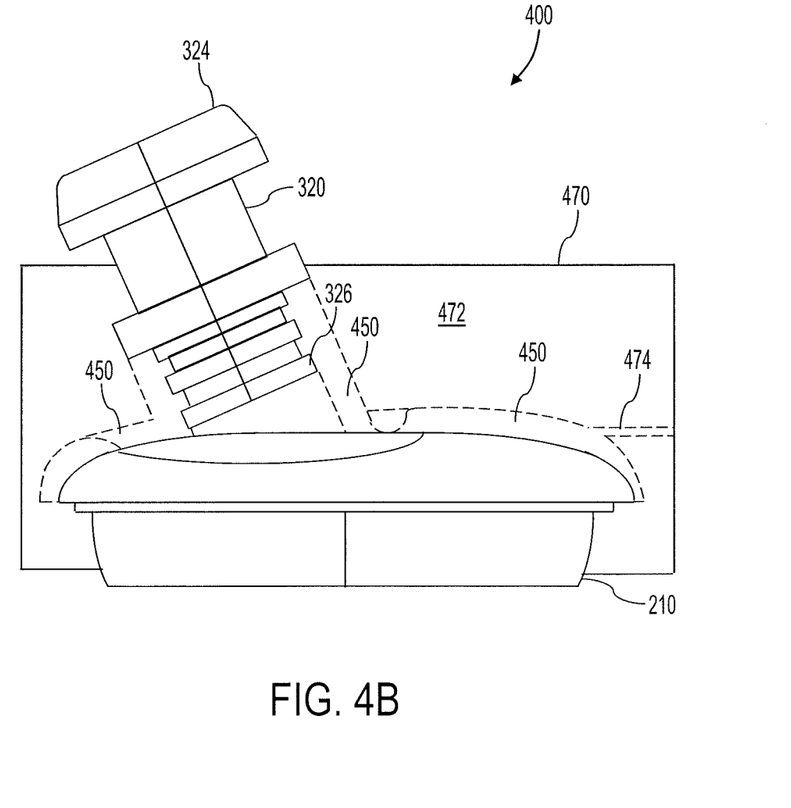
FIG. 4B is a view of the mold assembly with the first mold half removed to show the interior of the second mold half.

FIGS. 4A and 4B are simplified views of an example of a mold assembly 400 that may be used for manufacturing the headphone assembly 200 of FIGS. 3A through 3D. FIG. 4A is a view of the mold assembly 400 with a first mold half 480 and a second mold half 470 enclosing at least a portion of a rigid nozzle 320 and a rigid shell 210. FIG. 4B is a view of the mold assembly 400 with the first mold half 480 removed to show the interior of the second mold half 470.

The first mold half 480 and the second mold half 470 may be configured to at least partially enclose a rigid nozzle 320 and a rigid shell 210. As shown in FIGS. 4A and 4B, the rigid nozzle 320 and the rigid shell 210 may be positioned at least partially within the first mold half 480 and the second mold half 470 with the proximal end 326 of the rigid nozzle 320 proximate to the sound aperture 314 (FIG. 3C) of the rigid shell 210. In some embodiments, the rigid nozzle 320 may be positioned in the mold assembly 400 at an acute angle from a central axis 260 (FIG. 2) of the rigid shell 210. In some embodiments, the rigid shell 210 may be positioned at an angle of between about 18 degrees and about 30 degrees (e.g., about 24 degrees) from the central axis 260 of the rigid shell 210.

In some embodiments, an inner surface 472 of the second mold half 470 may define structures for supporting the rigid nozzle 320 and the rigid shell 210 in the proper position with respect to the mold assembly 400. Although not shown in FIGS. 4A and 4B, an inner surface 472 of the first mold half 480 may also define structures for supporting the rigid nozzle 320 and the rigid shell 210. In some embodiments, support for positioning the rigid nozzle 320 and the rigid body 210 in the proper position may be provided externally to the mold assembly 400 instead of, or in addition to, support structures of the first mold half 480 and the second mold half 470.

The inner surface of the first mold half 480 and the inner surface 472 of the second mold half 470 may also define a mold cavity 450 shaped to form an overmold structure 240 around the rigid nozzle 320 and the rigid shell 210. For example, the mold cavity 450 may define the nozzle portion 242 and the shell portion 244 of the overmold structure 240. An insert (not shown) may be positioned within the mold cavity 450 to form the sound passage 349.

At least one of the first mold half 480 and the second mold half 470 may also define at least one injection passage 474 extending from outside the mold assembly 400 into the mold cavity 450. A flowable polymer or polymer precursor material for forming the overmold structure 240 may be injected into the mold cavity 450 through the injection passage 474 (e.g., often referred to as a "gate" and/or "runner" in injection molding terminology). The polymer or polymer precursor material may take the form of the overmold structure 240, as defined by the mold cavity 450 and insert. When the polymer or polymer precursor material has cooled or cured, the first mold half 480, the second mold half 470, and the insert may be removed, leaving the rigid nozzle 320 permanently and flexibly coupled to the rigid shell 210 by the overmold structure 240.

In some embodiments, the flowable polymer or polymer precursor material may be heated before injection sufficiently to melt the surfaces of the rigid nozzle 320 and the rigid shell 210 to cause chemical adhesion between the overmold structure 240 and each of the rigid nozzle 320 and the rigid shell 210. In some embodiments, the mold assembly 400 may be cured to bond the overmold structure 240 to the rigid nozzle 320 and the rigid shell 210.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. An in-ear headphone assembly, comprising:
   a rigid shell defining a volume and configured for housing an audio driver, a first side of the rigid shell defining a sound aperture;
   a rigid nozzle defining a sound channel extending axially therethrough, the rigid nozzle comprising a distal end configured for insertion at least partially into an ear canal of a user, and a proximal end opposite the distal end; and
   a resilient overmold structure permanently molded to the rigid nozzle and the rigid shell, securing the proximal end of the rigid nozzle proximate to the first side of the rigid shell, the resilient overmold structure defining a sound passage acoustically coupling the volume to the sound channel through the sound aperture and the proximal end of the rigid nozzle, wherein:
      the resilient overmold structure includes a shell portion coupled to the first side of the rigid shell and a nozzle portion extending from an outer face of the shell portion around an outside surface of the rigid nozzle,
      an end surface of the nozzle portion opposite the shell portion abuts an annular protrusion extending outward from an outer surface of the rigid nozzle, and
      the shell portion includes a recess indented toward the sound aperture around an interface between the shell portion and the nozzle portion to increase flexibility between the rigid nozzle and the rigid shell.

2. The headphone assembly of claim 1, wherein the shell portion of the overmold structure is indented at least slightly into the sound aperture of the rigid shell at the recess of the shell portion of the overmold structure.

3. The headphone assembly of claim 1, wherein the recess includes a continuous recess extending all the way around the interface between the nozzle portion and the shell portion of the overmold structure.

4. The headphone assembly of claim 1, wherein an undeformed axis of the rigid nozzle forms an acute angle with a central axis of the rigid shell when no deforming force is applied to the rigid nozzle.

5. The headphone assembly of claim 4, wherein the acute angle is between about 18 degrees and about 30 degrees.

6. The headphone assembly of claim 4, wherein the acute angle is about 24 degrees.

7. The headphone assembly of claim 1, wherein, when deforming forces are applied to the rigid nozzle, the rigid nozzle is capable of deflecting within a range of motion defined by a circular cone about an undeformed axis of the rigid nozzle, the undeformed axis of the rigid nozzle defined by a central axis of the rigid nozzle when no deforming force is applied to the rigid nozzle.

8. The headphone assembly of claim 7, wherein the rigid nozzle is capable of deflecting at least about 5 degrees in all directions about the undeformed axis of the rigid nozzle.

9. The headphone assembly of claim 1, wherein the resilient overmold structure includes an elastomeric material.

10. The headphone assembly of claim 1, further comprising a resilient eartip removably coupled to the distal end of the rigid nozzle.

11. The headphone assembly of claim 1, wherein the resilient overmold structure includes a plurality of protrusions matingly engaging indentations in the rigid nozzle and the rigid shell.

12. A method of flexibly attaching a rigid nozzle to a rigid shell to form an in-ear headphone assembly, the method comprising:
    positioning a rigid nozzle and a rigid shell within a cavity of a mold such that a proximal end of the rigid nozzle is located proximate to a sound aperture defined by a first side of the rigid shell, wherein the rigid nozzle comprises a distal end configured for insertion at least partially into an ear canal of a user, the proximal end being opposite the distal end, and wherein the rigid shell defines a volume and is configured for housing an audio driver; and
    injecting a polymer or polymer precursor material into the cavity of the mold and forming a resilient overmold structure around the rigid nozzle and the rigid shell, the resilient overmold structure defining a sound passage acoustically coupling the volume through the sound aperture to a sound channel defined by and extending axially through the rigid nozzle, the resilient overmold structure providing a permanent, flexible connection between the rigid nozzle and the rigid shell, wherein:
    the resilient overmold structure includes a shell portion coupled to the first side of the rigid shell and a nozzle portion extending from an outer face of the shell portion around an outside surface of the rigid nozzle,
    an end surface of the nozzle portion opposite the shell portion abuts an annular protrusion extending outward from an outer surface of the rigid nozzle, and
    the shell portion includes a recess indented toward the sound aperture around an interface between the shell portion and the nozzle portion to increase flexibility between the rigid nozzle and the rigid shell.

13. The method of claim 12, wherein injecting the polymer or polymer precursor material into the cavity of the mold comprises:
    heating the polymer or polymer precursor material to a temperature that is sufficiently high to at least partially melt surfaces of the rigid nozzle and the rigid shell when the polymer or polymer precursor material contacts the rigid nozzle and the rigid shell; and
    injecting the heated polymer or polymer precursor material into the cavity of the mold.

14. The method of claim 12, wherein injecting the polymer or polymer precursor material into the cavity of the mold comprises injecting a material selected to permanently bond to the rigid nozzle and the rigid shell when cured.

15. The method of claim 14, further comprising heating the polymer or polymer precursor material to permanently bond the overmold structure to the rigid nozzle and the rigid shell.

16. The method of claim 12, wherein injecting the polymer or polymer precursor material into the cavity of the mold comprises injecting at least one of a thermoplastic elastomer and a thermoset elastomer into the cavity of the mold.

17. The method of claim 12, wherein positioning the rigid nozzle and the rigid shell within the cavity of the mold comprises positioning the rigid nozzle at an angle of about 18 degrees to about 30 degrees to a central axis of the rigid shell.

* * * * *